Patented Feb. 21, 1928.

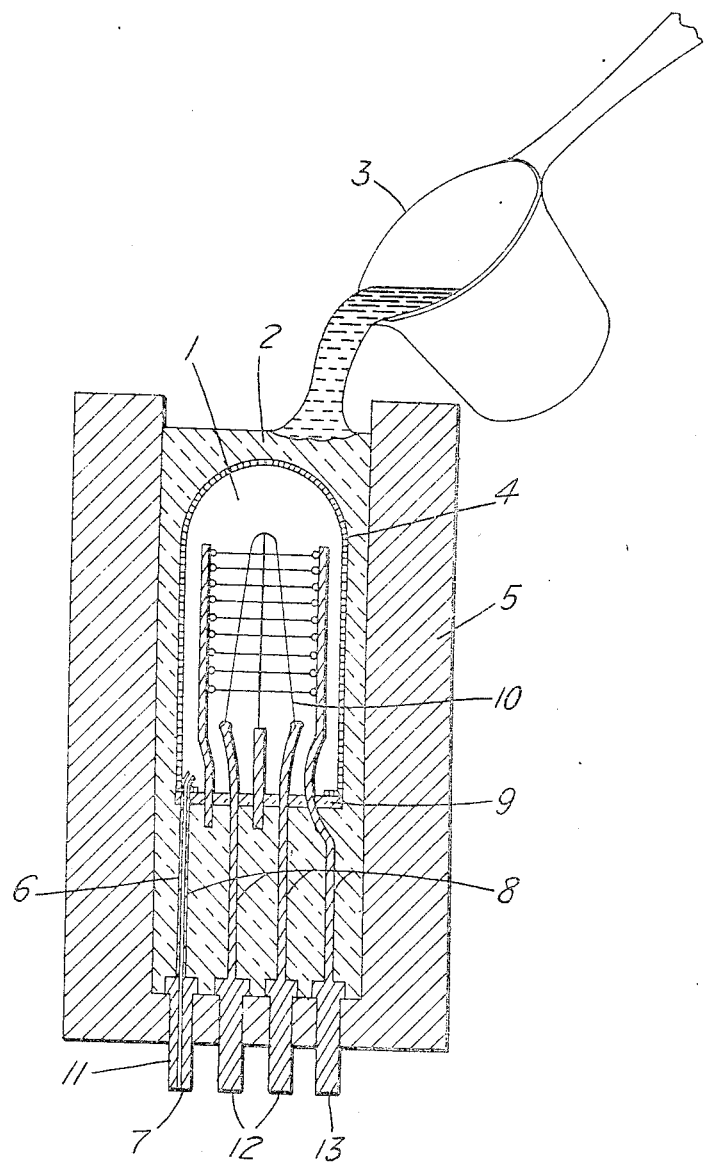

1,660,025

UNITED STATES PATENT OFFICE.

ARTHUR H. ALLEN, JR., OF PHILADELPHIA, PENNSYLVANIA.

VACUUM TUBE.

Application filed March 17, 1927. Serial No. 176,009.

The object of this invention is to cut down on the amount of operations and labor necessary with the present methods of manufacture by providing a new and simpler method of manufacture, thereby cutting down on the cost of making vacuum tubes. Another object is to provide a tube which is rigid and of durable construction thereby adding to the life and use of the tube. Another object is to provide a tube which is non-microphonic. Also a common molded base and container.

The custom at present and in the past has been to manufacture vacuum tubes by welding together the container and a stem or support of previously shaped glass and then extracting the air by means of a glass tube extension which is sealed after the air has been extracted.

There are many disadvantages to this method of manufacture as follows:

In the first place, the whole procedure of the present method of manufacture is a very delicate and ticklish procedure requiring skilled glass blowers and other workmen and very elaborate and complicated machinery and with all of this the tube produced is delicate, fragile, and microphonic.

It is delicate and fragile because it is made of welded parts of thin tubular glass.

It is microphonic because the thin glass can easily vibrate in accordance with air waves and other vibrations. It cannot well be made thicker because of the difficulties arising in the welding of thick glass, etc.

In order to eliminate the above mentioned disadvantages and many other lesser disadvantages which are not mentioned I have provided the following method of manufacture.

The idea is to first prepare the elements such as filament, grid, plate, etc. in their proper relative positions and using a convex metal form or mould for instance, to surround them, for example, a bell shaped screening.

This form or mould may be the plate or it may be a separate form or mould outside of the plate. The object is to provide a form or mould to support molten glass or similar molten substance around the elements.

Now the assembled elements including the aforesaid form are placed in a larger concave mould which is used for moulding the outside shape of the vacuum tube. The leads from the elements may extend through the bottom of the mould. At the base of the elements a partition of insulative material for instance, a disc of mica may be used to prevent the molten glass from reaching and destroying the elements.

Metal contact prongs such as are found at the base of tubes at present, may extend into the mould slightly.

In addition and of special note, is the use of a thin, hollow wire of, for instance, combined metallic alloy, used to extend from within the tube through the wall of the tube to the outside, for the purpose of extracting the air and creating the necessary vacuum therein. This hollow wire may be individual or it may be one of the leads to the elements if desired.

After the elements, bell shaped mould, and the hollow wire are in the proper position in the concave exterior mould, molten glass or other suitable material at the proper temperature is poured in and allowed to cool off at the proper rate to prevent cracking, etc.

It should be noted that the bell shaped mould and the disc at the base thereof provide a form for the molten glass poured thereabout thereby maintaining the space within, which, later, when the air is extracted, becomes the vacuum chamber of the vacuum tube.

The exterior or concave mould acts as a support for the elements, leads, bell shaped mould, hollow wire, etc. and forms the exterior contour of the vacuum tube.

After the molten material has solidified and cooled to the surrounding temperature the exterior or concave mould may be removed, yielding a completely constructed, rigid tube.

With regard to evacuating the tube, this may be done to advantage before the tube has cooled off but after the molten substance is sufficiently stiff to maintain its form.

The air is drawn out through the thin hollow wire by for instance attaching a vacuum pump at the exterior end of the hollow wire and when the proper vacuum or gas density is obtained within the tube the wire is sealed by melting or fusing the hollow wire or soldering, etc.

It should be noted that while I have used the word vacuum tube, the invention is equally adaptable to other types of tubes such as gas filled tubes, electric lights, etc. and tubes having entirely different construction of the anode, cathode, and grid elements. All such devices come within the scope of the invention for the reason that it is a method of manufacture which is equally adaptable to the manufacture of all devices under the general class of electron tubes and tubes having vacuum or gas filled chambers.

A very important and new feature brought out by the method of manufacture is the moulding of the container and base at the same time, in the one operation, and of the same material.

Referring to the drawing a simple cross section view is shown for the reason that the invention is general and detailed views, it is believed, would be confusing and unnecessary.

1, designates the vacuum or gas filled chamber of the tube.

2, the molten glass or other suitable material.

3, the vat from which the molten material is poured into the mould.

4, the interior supporting mould which may be of nickel sheet, perforated, screening, or other suitable material properly shaped to support the molten material.

5, is the exterior mould which may be of any material or shape suitable for moulding glass or whatever molten material is used.

6, is a hollow wire which may be of alloyed metal to give proper expansion characteristics. It may be of other material and it may either be round, square or otherwise shaped without departing from the scope of the invention. If of metal, it may be used as one of element leads as is shown in the drawing.

7, is the point at which the hollow wire is sealed. If desired it may be sealed at another point.

8, are the four leads from the internal elements of the tube of which in this case the hollow wire 6 is one.

9, is a plate or disc of for instance mica to prevent the molten material from reaching the elements.

10, shows a wire filament which may be any kind of a cathode.

11, is the contact prong to which the plate lead is attached.

12, is the two contact prongs to which the two filament leads are attached.

13, is the contact prong to which the grid lead is attached.

Having thus described my invention, I claim:

1. The method of manufacturing vacuum tubes comprising molding the container in contradistinction to welding together previously molded parts.

2. A vacuum tube having the container and base molded in the same operation.

Signed at New York, county of New York, State of New York, this 14 day of March, 1927.

ARTHUR H. ALLEN, Jr.